Patented June 6, 1950

2,510,108

UNITED STATES PATENT OFFICE 2,510,108

POLYMERIC AMINO COMPOUNDS AND PROCESS FOR PREPARATION THEREOF

Daniel F. Herman, Newark, N. J., assignor to Publicker Industries Inc., Philadelphia, Pa., a corporation of Pennsylvania No Drawing. Application August 22, 1947, Serial No. 770,193

19 Claims. (Cl. 260—63)

1

The present invention relates to a novel class of polymeric compositions and to a method for their preparation. More particularly, it is concerned with polymers having the following common structural unit:

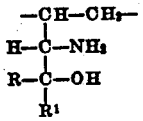

wherein R and R$^1$ may be either aryl, alkyl or aralkyl, and R and R$^1$ combined may constitute a part of a cycloaliphatic ring.

Polymers of the type contemplated by the present invention may be prepared by first subjecting a suitable vinyl t-hydroxy ketone to polymerization in the presence or absence of one or more polymerizable open chain compounds containing at least one —CH=C= group as described in co-pending application U. S. Serial No. 759,725, filed July 8, 1947, by R. S. Wilder and D. F. Herman. This polymerization, in general, can be effected in the presence or absence of a solvent for the reactant or reactants, and preferably in the presence of a suitable polymerization catalyst at a temperature varying generally from between about 30° C. to 100° C. or higher. The combinations and proportions of the reactants utilized in preparing these polymers may vary widely. The polymers thus obtained are usually soft to hard, clear to cloudy products frequently rubber-like in nature, especially those polymers in which butadiene or its homologues or analogues are utilized. The resulting polymer is then dissolved in a suitable solvent after which it is subjected to reductive amination in the presence of a mixture of ammonia and hydrogen, together with a hydrogenation catalyst at elevated temperature and pressure. Also, if considered desirable, the aforesaid polymer may be isolated from the reaction medium in which it is formed and dried after which it then may be suitably dissolved and subjected to reductive amination. On completion of the hydrogenation, as may be evidenced by failure of the reaction mixture to absorb additional hydrogen, the catalyst is separated therefrom by filtration, and the polymer separated from the resulting filtrate preferably by pouring the latter into water whereby the polymeric product is obtained in the form of a precipitate. Alternatively, certain of the polymers of my invention may be suitably prepared by subjecting the reactant or reactants in monomeric form to reductive amination under the conditions described herein.

2

The temperatures employed in carrying out my invention may vary widely, and, in general, may range from about 25° C. to 50° C. up to a temperature not substantially in excess of about 200° C. In the majority of instances, however, temperatures of between about 100 to 150° C. are preferred.

Any hydrogenation catalyst which possesses catalytic activity under the conditions employed may be utilized in synthesizing the compositions of my invention. Examples of such catalysts are nickel chromite, copper chromite, cobalt-on-kieselguhr, copper silica gel, and the like. I prefer, however, to employ a finely divided nickel catalyst prepared by subjecting a nickel-aluminum alloy containing about 50% aluminum and 50% nickel to the action of a strong alkali solution, whereby the aluminum is dissolved out of the alloy. The remaining leached nickel residue is then washed free from alkali and salts with water, and kept under liquid. The catalyst produced in this manner is active at temperatures as low as approximately 25° C. and has an exceptionally long life.

The reductive amination is generally effected at pressures ranging from about 800 to 2000 lbs. per square inch. I have found it preferable, however, to effect such reaction at a pressure of from about 1000 lbs. to 1500 lbs. per square inch. When carrying out the reaction in accordance with the preferred conditions described above, the hydrogenation is, in general, found to be complete after a period of from between about ten to twenty hours. Optimum conditions in regard to temperature, pressure, and catalyst in any given instance, however, may be readily determined by simple experiment. Solvents suitable for use in this reaction are the various saturated hydrocarbons such as methyl cyclohexane, decalin, etc., and the lower aliphatic alcohols such as methanol, ethanol, isopropanol, and the like.

The usual types of hydrogenation apparatus may be employed such as, for example, pressure autoclaves fitted with suitable agitating devices or reaction vessels of the "rocking bomb" type described in "Reactions of Hydrogen," Homer Adkins, University of Wisconsin Press, 1937, chapter 3.

As examples of suitable vinyl t-hydroxy ketones that may be employed in carrying out our invention, there may be mentioned 2-methyl-4-penten - 2 - ol - 3 - one, 4-methyl-1-hexen-4-ol-3-one, 4,6-dimethyl-1-hepten-4-ol-3-one, 4-ethyl-1-hexen-4-ol-3-one, 1-(1-hydroxycyclohexyl)-2-propen-1-one, 2-phenyl-4-penten-2-ol-3-one, 1-

(1-hydroxycamphoryl)-2-propen-1-one, 1-(1-hydroxycyclopentyl)-2-propen-1-one, 2-(β-phenylethyl)-4-penten-2-ol-3-one, and the like. These vinyl t-hydroxy ketones are readily prepared by the procedure described and claimed in copending application, U. S. Serial No. 740,728, filed April 10, 1947 by Richard S. Wilder and Daniel F. Herman. In accordance with the procedure there described the vinyl t-hydroxy ketones are produced by first preparing the corresponding N-disubstituted amino t-hydroxy ketones. This synthesis involves condensing a suitable t-hydroxy ketone with formaldehyde and a secondary amine salt as described in detail in copending application, U. S. Serial No. 740,727, by Richard S. Wilder and Daniel F. Herman. The N-disubstituted amino t-hydroxy ketone thus prepared is then converted to the corresponding vinyl t-hydroxy ketone by subjecting to pyrolysis the reaction mixture containing the N-disubstituted amino t-hydroxy ketone. The vinyl t-hydroxy ketone thus produced is then preferably removed from the reaction mixture as it is formed by means of distillation.

The polymerizable compounds which may be copolymerized with the vinyl t-hydroxy ketones in preparing the polymeric compositions of the present invention, comprise an extremely large group of substances, and may be selected from a class of open chain compounds having at least one —CH=C= group in the molecule. Examples of polymerizable compounds containing at least one —CH=C= group and which may be employed in the synthesis of the compositions of my invention, are compounds possessing one of the following groups and no others:

$$-CH=CH-, \quad CH_2=CH-$$

and $CH_2=C=$, wherein each of the free valence bonds in the latter formula is satisfied by a separate substituent other than hydrogen. Specific compounds falling within the above mentioned broad class and which possess the —CH=CH— grouping are cinnamic acid, stilbene, β-chlorovinyl acetate, dicrotyl ether, allyl crotyl ether, vinyl crotyl ether, vinyl anol ether, dicrotyl maleate, and the like. Compounds specifically covered by the grouping $CH_2=CH-$ and which may be utilized in preparing our new copolymers are trivinyl meseate, diallyl maleate, trivinyl citrate, styrene, vinyl butyl ether, divinyl-o-phenylene diacetate, divinyl phenyl butyrate o-carboxylate, dichloro styrene, methyl acrylate, vinyl allyl ether, allyl ether, allyl crotyl ether, ethylene glycol divinyl ether, diethylene glycol diallyl ether, divinyl methyl glyceryl ether, divinyl glyceryl ether, acrylonitrile, vinyl acetate, tetravinyl pentaerythrityl ether, hydroquinone divinyl ether, phenyl (1,4-diethyl) divinyl ether, o-vinyl phenyl vinyl ether, vinyl chloride, vinyl chavicol ether, allyl ether of coniferyl allyl ether, vinyl-o-toluate, vinyl phenyl acetate, and the like. As examples of the compounds specifically covered by the grouping $CH_2=C=$ wherein each of the two free valences is satisfied by a separate substituent other than hydrogen, there may be mentioned di-β-chlorallyl ether, vinyl methyl methallyl ether, trimethallyl glyceryl ether, methallyl allyl ether, α-phenyl α-methyl allyl methallyl ether, methallyl-α-phenyl allyl ether, di β-methallyl maleate, vinylidine chloride, methyl isopropenyl ketone, α-chloro-α-phenyl ethylene, and the like.

In connection with the foregoing, the expression "polymerizable open chain compound" appearing in the present description and claims is intended to cover, in addition to the ordinary aliphatic polymerizable compounds containing such an unsaturated structure, compounds such as divinyl benzene, styrene, vinyl pyridine, and divinyl naphthalene, as well as the vinyl t-hydroxy ketones, per se, and various other compounds such as those specifically enumerated above.

The exact structure of these polymeric amino hydroxy compositions is not accurately known; however, from presently existing knowledge relative to the manner in which compounds of the general class here under consideration polymerize, it is presumed that structures of the following type are involved, using as examples, polymeric amino hydroxy compositions prepared by polymerizing 2-methyl-4-penten-2-ol-3-one alone, a mixture of butadiene and 2-methyl-4-penten-2-ol-3-one, and a mixture of styrene and 2-methyl-4-penten-2-ol-3-one, respectively.

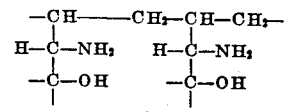

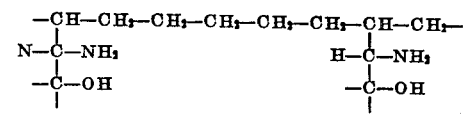

and

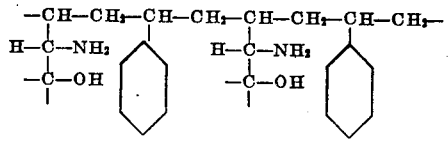

Polymers of the type contemplated by my invention are completely saturated in the aliphatic portion thereof under the conditions employed. Also, head to tail, head to head, tail to tail and cross linked polymers may be formed in accordance with the present invention.

The degree of amination occurring in the polymeric hydroxy ketone treated may, for the most part, be controlled by varying the ammonia-polymer ratio and the time, temperature and pressure at which the reductive amination is effected. Thus, by controlling the extent to which amination occurs the basicity and solubility of the resulting polymer may be regulated within relatively narrow limits.

My invention may be further illustrated by the following specific examples:

Example I

A polymer of 2-methyl-4-penten-2-ol-3-one is first prepared by refluxing, for six hours, a solution consisting of 50 parts of 2-methyl-4-penten-2-ol-3-one in 150 parts of 95% ethanol in the presence of 0.5 part of benzoyl peroxide. At the end of the reaction period, the resulting polymer is precipitated by slowly adding the reaction mixture to water. Thirty parts of the polymer thus produced is dried at 110° C. and thereafter dissolved in 170 parts of isopropyl alcohol, after which it is introduced together with 20 parts of liquid ammonia and 3 parts of nickel catalyst into a glass lined hydrogenation chamber of the rocking bomb type. Hydrogen is introduced into the reaction chamber and the reductive amination is effected at a pressure of 1,000 lbs. per square inch at 150° C. for a period of sixteen hours. At the end of this period no further hydrogen absorption is observed. The hydrogenation chamber is then cooled and the hydrogenated mixture filtered to give a clear, yellow solution of the polymeric product. This solution is next poured slowly into 1,500 parts of water to give a precipitate of the polymer. However, a portion of the polymer is observed to emulsify and give a milky solution. Complete precipitation of the amino hydroxy polymer can be obtained by first dissolving the basic polymeric emulsion in 10% sulphuric acid, and then precipitating the polymer with 10% sodium hydroxide. Addition of sodium chloride to the emulsion also assists in coagulation of the product. The polymer when dried at 90° C. possessed a slight amino alcohol odor.

*Example II*

A solution of 150 parts of 2-methyl-4-penten-2-ol-3-one in 350 parts of isopropyl alcohol and 100 parts of liquid ammonia is introduced into an autoclave and hydrogenated at 150° C. and 800 to 1,300 lbs. pressure in the presence of 20 parts of nickel catalyst. After a period of thirteen hours no additional hydrogen absorption is observed. The polymeric product is then isolated in accordance with the procedure described in Example I and is found to have essentially the same characteristics.

*Example III*

A mixture of 10 parts of 4,6-dimethyl-1-hepten-4-ol-3-one and 10 parts of 2-methyl-3-chloro-1,3-butadiene is dissolved in 80 parts of methylcyclohexane containing 0.2 part of benzoyl peroxide. The resulting solution is heated on a steam bath for approximately three hours to give a solution of the polymer. The mixture thus obtained is next introduced into a suitable hydrogenation apparatus together with 5 parts of liquid ammonia and 1 part of nickel catalyst. This mixture is next subjected to hydrogenation at a pressure of 1,000 to 1,200 lbs., and at a temperature of 140° C. for a period of twelve hours. Thereafter no additional hydrogen absorption is observed. The polymeric amino hydroxy composition thus obtained is then isolated in accordance with the procedure of Example I.

*Example IV*

A mixture of 5 parts of methyl methacrylate and 5 parts of 2-methyl-4-penten-2-ol-3-one is heated on a steam bath in the presence of 0.3 part of benzoyl peroxide for one-half hour to give a hard, clear polymer soluble in ethanol and toluene. A solution consisting of 5 parts of the resulting polymer in 10 parts of 95% ethanol is introduced into a suitable hydrogenation apparatus together with 3 parts of liquid ammonia and 0.5 part of nickel catalyst. This mixture is next subjected to hydrogenation at a pressure of approximately 1,000 lbs. per square inch, and at a reaction temperature of 135° C. for a period of fifteen hours, after which the absorption of hydrogen is observed to cease. The reaction mixture is then withdrawn from the hydrogenation chamber and the polymeric amino alcohol isolated as described in Example I.

*Example V*

A mixture of 5 parts of vinyl acetate and 5 parts of 2-methyl-4-penten-2-ol-3-one is heated on a steam bath for one-half hour in the presence of 0.2 part of benzoyl peroxide to give a soft, clear, elastic polymer which is soluble in ethanol. A solution consisting of 5 parts of the resulting polymer is dissolved in 15 parts of 95% ethanol and introduced into a suitable hydrogenation chamber together with 2½ parts of liquid ammonia and 0.5 part of nickel catalyst. This mixture is next subjected to hydrogenation at a pressure of 1,200 lbs. per square inch and at a temperature of approximately 140° C. for a period of fourteen hours, after which no additional hydrogen absorption is observed. The polymeric amino alcohol thus obtained is then isolated in the manner described above.

*Example VI*

A mixture of 10 parts of vinyl pyridine and 10 parts of 2-methyl-4-penten-2-ol-3-one is heated on a steam bath in the presence of 0.2 part of benzoyl peroxide for one-half hour to give a viscous, basic polymer. The polymer thus obtained is next dissolved in 60 parts of isopropyl alcohol after which the resulting solution is placed in a hydrogenation chamber together with 6 parts of liquid ammonia and 1 part of nickel catalyst. This mixture is next subjected to hydrogenation at a temperature of 150° C. and a pressure of 1,000 lbs. per square inch for a period of twelve hours. Thereafter, the contents of the hydrogenation chamber are withdrawn and the polymeric amino alcohol separated as above.

*Example VII*

A mixture of 10 parts of divinyl ether and 10 parts of 2-methyl-4-penten-2-ol-3-one is dissolved in 15 parts of ethanol and heated in a pressure bottle for eight hours at 70° C. in the presence of 0.2 part of benzoyl peroxide. The polymer thus obtained is then dissolved in 50 parts of ethanol and introduced into a hydrogenation chamber together with 6 parts of liquid ammonia and 1 part of nickel catalyst. This mixture is next subjected to hydrogenation at a temperature of 150° C. for a period of seventeen hours. The contents of the hydrogenation chamber are then withdrawn and the polymeric product separated.

*Example VIII*

A mixture of 10 parts of 2-methyl-4-penten-2-ol-3-one and 10 parts of styrene dissolved in 30 parts of toluene, is heated on a steam bath in the presence of 0.2 part of benzoyl peroxide to give, within one-half hour, a viscous solution of the copolymer, soluble in the hot reaction mixture, but which precipitates in the cold. The product thus obtained is then placed in a suitable hydrogenation chamber together with 50 parts of methylcyclohexane, 6 parts of liquid ammonia and 1 part of nickel catalyst. This mixture is thereafter subjected to hydrogenation at a pressure of 1,200 lbs. per square inch and a temperature of 145° C. for twelve hours. At the end of this period the contents of the reaction of the hydrogenation chamber are withdrawn and the polymeric amino alcohol isolated.

*Example IX*

A mixture of 20 parts of 2-methyl-4-penten-2-ol-3-one and 20 parts of b tadiene is polymerized in the presence of 0.4 part of benzoyl peroxide by heating in a pressure bottle for twelve hours at 60° C. A viscous product results which is dissolved in 95% ethanol and precipitated by pouring the solution into water. This rubbery, white, soft, elastic polymer is next placed in a suitable hydrogenation chamber together with 100 parts of 95% ethanol, 12 parts of liquid ammonia, and 2 parts of nickel catalyst, after which it is subjected to hydrogenation at a pressure of 1,000 lbs. per square inch and a temperature of 150° C. for a period of twelve hours. Thereafter, the mixture is withdrawn from the hydrogenation chamber, the catalyst separated therefrom by filtration, and the polymeric amino alcohol isolated in the usual manner.

*Example X*

A mixture of 10 parts of 1-(1-hydroxycyclohexyl)-2-propene-1-one and 15 parts of dicrotyl ether in 65 parts of methylcyclohexane is heated on a steam bath in the presence of 0.3 part of benzoyl peroxide for one and one-half hours to give a viscous polymer. The resulting mixture is then placed in a suitable hydrogenation chamber together with 8 parts of ammonia and 2 parts of nickel catalyst. Hydrogen is then introduced and the mixture subjected to hydrogenation at a pressure of 1,000 lbs. per square inch for fourteen hours at a temperature of 130° C. Thereafter the reaction mixture is withdrawn and the polymeric amino alcohol, thus obtained, separated as above.

*Example XI*

A mixture of 20 parts of vinyl butyl ether and 15 parts of 2-(β-phenyl ethyl)-4-penten-2-ol-3-one in 75 parts of methylcyclohexane is heated on the steam bath in the presence of 0.5 part of benzoyl peroxide for one hour to give a soft, clear polymer. This mixture is then placed in a hydrogenation chamber together with 10 parts of liquid ammonia and 4 parts of nickel chromite catalyst, after which hydrogen is introduced and the mixture hydrogenated at a pressure of 1,200 lbs. per square inch at 140° C. for fourteen hours. The polymeric amino alcohol thus obtained is then isolated as described above.

In general, on the basis of the nitrogen analysis, it has been found that from about 40% to 45% of the carbonyl groups, theoretically present in the original polymeric hydroxy ketone, are converted into amino groups. Likewise, from about 40% to 45% of the structural units in the new polymer contain nitrogen, although as previously indicated the percentage of amino groups may, in general, be increased or decreased by varying the quantity of ammonia employed, and/or the time of reaction, temperature, pressure, etc. However, it has been observed that only from about 45% to 50% of the nitrogen present is sufficiently basic to be titrated by dilute hydrochloric acid to a methyl orange end point.

The polymeric amino alcohols of the class discussed above are, in general, found to be soluble in dilute sulphuric, hydrochloric, phosphoric, and acetic acids and can be readily precipitated by the addition of dilute ammonia or sodium hydroxide to an acidic solution of the polymers, and adjusting the pH of such a solution to a value of from between about 8 to 11. In general, these polymers are soluble in ethanol, isopropyl alcohol, dioxane, hot acetate, slightly soluble in cold acetone, very slightly soluble in toluene, and insoluble in chloroform.

Although solutions of these polymers in dilute acids possess no appreciable foaming properties, suspensions in slightly basic solutions are capable of forming stable stiff foams. For instance, 0.04% of the polymer produced in Example I, in 50 parts of water at 100° F. and at a pH of 8, gives 45 parts of a stable foam on being shaken 20 times. Under the same conditions, a 0.01% suspension of the same polymer gives 25 parts of foam. At a pH of 11, a 0.04% suspension gives 40 parts of foam. On acidification these solutions lose their foaming properties completely. A dried sample of this particular polymer is observed to possess poor foaming properties, but when dissolved in dilute acid and reprecipitated with dilute base, its foaming properties are restored.

In addition to possessing marked utility as a foaming agent, the polymeric amino alcohols of my invention may be utilized as ion exchange resins in procedures where resins of the aforesaid type are required, and are useful as intermediates for the preparation of numerous other valuable products.

What I claim is:

1. A polymeric amino alcohol composition prepared by subjecting a copolymer of a vinyl t-hydroxy ketone and a polymerizable open chain compound having at least one —CH=C= group, wherein the keto and t-hydroxyl groups of said vinyl t-hydroxy ketone are one and two carbon atoms removed respectively from the vinyl group, to hydrogenation in the liquid phase in the presence of ammonia and a hydrogenation catalyst at a temperature not substantially in excess of 200° C.

2. A polymeric amino alcohol composition prepared by subjecting a copolymer of a vinyl t-hydroxy ketone and a polymerizable open chain compound having one —CH=C= group, wherein the keto and t-hydroxyl groups of said vinyl t-hydroxy ketone are one and two carbon atoms removed respectively from the vinyl group, to hydrogenation in the liquid phase in the presence of ammonia and a hydrogenation catalyst at a temperature not substantially in excess of 200° C.

3. A polymeric amino alcohol composition prepared by subjecting a copolymer of a vinyl t-hydroxy ketone and a polymerizable open chain compound having two —CH=C= groups, wherein the keto and t-hydroxyl groups of said vinyl t-hydroxy ketone are one and two carbon atoms removed respectively from the vinyl group, to hydrogenation in the liquid phase in the presence of ammonia and a hydrogenation catalyst at a temperature not substantially in excess of 200° C.

4. A polymeric amino alcohol composition prepared by subjecting a copolymer of a vinyl t-hydroxy ketone and a polymerizable open chain compound having one $CH_2$=CH— group, wherein the keto and t-hydroxyl groups of said vinyl t-hydroxy ketone are one and two carbon atoms removed respectively from the vinyl group, to hydrogenation in the liquid phase in the presence of ammonia and a hydrogenation catalyst at a temperature not substantially in excess of 200° C.

5. A polymeric amino alcohol composition prepared by subjecting a copolymer of a vinyl t-hydroxy ketone and a polymerizable open chain compound having two $CH_2$=CH— groups, wherein the keto and t-hydroxyl groups of said vinyl t-hydroxy ketone are one and two carbon atoms removed respectively from the vinyl group, to hydrogenation in the liquid phase in the presence of ammonia and a hydrogenation catalyst at a temperature not substantially in excess of 200° C.

6. A polymeric amino alcohol composition prepared by subjecting a copolymer of a vinyl t-hydroxy ketone and a polymerizable open chain compound having one $CH_2$=C= group, wherein the keto and t-hydroxyl groups of said vinyl t-hydroxy ketone are one and two carbon atoms removed respectively from the vinyl group, to hydrogenation in the liquid phase in the presence of ammonia and a hydrogenation catalyst at a temperature not substantially in excess of 200° C.

7. A polymeric amino alcohol composition prepared by subjecting a copolymer of a vinyl t-hydroxy ketone and a polymerizable open chain compound having one —CH=CH— group, wherein the keto and t-hydroxyl groups of said vinyl t-hydroxy ketone are one and two carbon atoms removed respectively from the vinyl group, to hydrogenation in the liquid phase in the presence of ammonia and a hydrogenation catalyst at a temperature not substantially in excess of 200° C.

8. A polymeric amino alcohol composition prepared by subjecting a copolymer of a vinyl t-hydroxy ketone and a polymerizable open chain compound having two —CH=CH— groups, wherein the keto and t-hydroxyl groups of said vinyl t-hydroxy ketone are one and two carbon atoms removed respectively from the vinyl group, to hydrogenation in the liquid phase in the presence of ammonia and a hydrogenation catalyst at a temperature not substantially in excess of 200° C.

9. A polymeric amino alcohol composition prepared by subjecting a polymer of 2-methyl-4-penten-2-ol-3-one, to hydrogenation in the liquid phase in the presence of ammonia and a hydrogenation catalyst.

10. A polymeric amino alcohol composition prepared by subjecting a copolymer of 4,6-dimethyl-1-hepten-4-ol-3-one and 2-methyl-3-chloro-1,3-butadiene, to hydrogenation in the liquid phase in the presence of ammonia and a hydrogenation catalyst.

11. A polymeric amino alcohol composition prepared by subjecting a copolymer of 2-methyl-4-penten-2-ol-3-one and styrene, to hydrogenation in the liquid phase in the presence of ammonia and a hydrogenation catalyst.

12. A process which comprises subjecting a copolymer of a vinyl t-hydroxy ketone and a polymerizable open chain compound having at least one —CH=C= group, wherein the keto and t-hydroxyl groups of said vinyl t-hydroxy ketone are one and two carbon atoms removed, respectively, from the vinyl group, to hydrogenation in the liquid phase in the presence of ammonia and a hydrogenation catalyst at a temperature not substatnially in excess of 200° C., thereby to produce a polymeric amino alcohol composition.

13. A process which comprises subjecting a copolymer of a vinyl t-hydroxy ketone and a polymerizable open chain compound having at least one —CH=C= group, wherein the keto and t-hydroxyl groups of said vinyl t-hydroxy ketone are one and two carbon atoms removed, respectively, from the vinyl group, to hydrogenation in the liquid phase in the presence of ammonia and a hydrogenation catalyst at a temperature of between about 100° C. to 150° C., thereby to produce a polymeric amino alcohol composition.

14. A process which comprises subjecting a copolymer of 2-methyl-4-penten-2-ol-3-one and styrene to hydrogenation in the liquid phase in the presence of ammonia and a hydrogenation catalyst at a temperature of between about 100° C. and 150° C., thereby to produce a polymeric amino alcohol composition.

15. A process which comprises subjecting a copolymer of 2-methyl-4-penten-2-ol-3-one and vinyl butyl ether to hydrogenation in the liquid phase in the presence of ammonia and a hydrogenation catalyst of a temperature of between about 100° C. and 150° C., thereby to produce a polymeric amino alcohol composition.

16. A process which comprises subjecting a copolymer of 4,6-dimethyl-1-hepten-4-ol-3-one and 2-methyl-3-chloro-1,3-butadiene to hydrogenation in the liquid phase in the presence of ammonia and a hydrogenation catalyst at a temperature of between about 100° C. and 150° C., thereby to produce a polymeric amino alcohol composition.

17. A process which comprises subjecting a copolymer of a vinyl t-hydroxy ketone and a polymerizable open chain compound having one $CH_2$=CH— group, wherein the keto and t-hydroxyl groups of said vinyl t-hydroxy ketone are one and two carbon atoms removed, respectively, from the vinyl group, to hydrogenation in the liquid phase in the presence of ammonia and a hydrogenation catalyst at a temperature of between about 100° C. and 150° C., thereby to produce a polymeric amino alcohol composition.

18. A process which comprises subjecting a copolymer of 2-methyl-4-penten-2-ol-3-one to hydrogenation in the liquid phase in the presence of ammonia and a hydrogenation catalyst at a temperature of between about 100° C. and 150° C., thereby to produce a polymeric amino alcohol composition.

19. A polymeric partially aminated keto alcohol prepared by subjecting to hydrogenation in the liquid phase in the presence of ammonia and a hydrogenation catalyst at a temperature not substantially in excess of 200° C., a copolymer of a vinyl t-hydroxy ketone and a polymerizable open chain compound having at least one —CH=C= group wherein the keto and hydroxyl groups are one and two carbon atoms removed, respectively, from the vinyl group, the carbonyl groups in said polymeric ketone compound having been converted to amino groups to the extent of not more than about 50% in which up to about 45% to 50% of the nitrogen of said amino groups is sufficiently basic to be titratable to a methyl orange end point.

DANIEL F. HERMAN.

REFERENCES CITED

The following references are of record in the file of this patent:

UNITED STATES PATENTS

| Number | Name | Date |
| --- | --- | --- |
| 2,063,158 | Greenewalt | Dec. 8, 1936 |